UNITED STATES PATENT OFFICE.

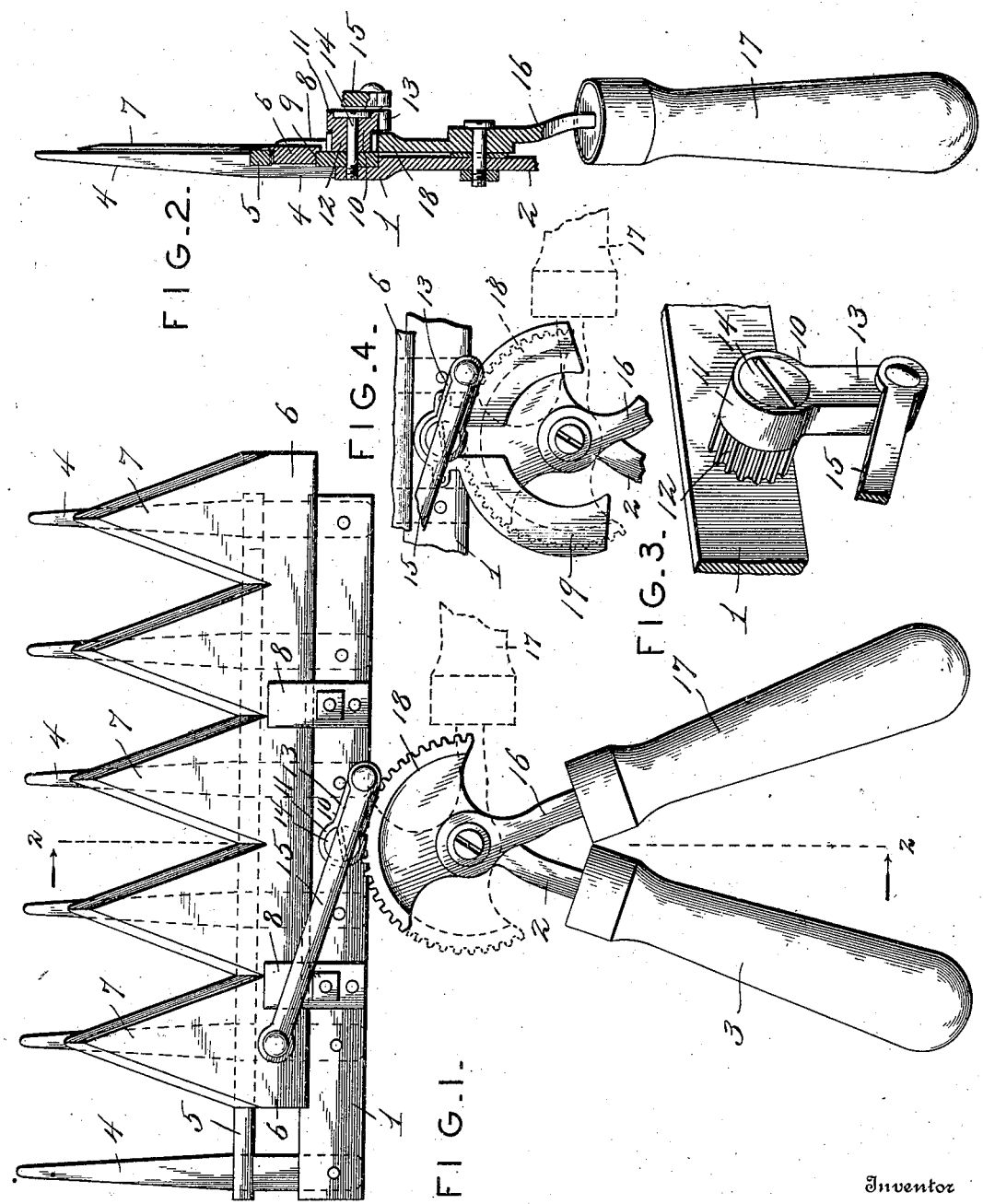

FREDERICK SICKLES VOORHEES, OF FREEHOLD, NEW JERSEY.

HEDGE-TRIMMER.

SPECIFICATION forming part of Letters Patent No. 718,404, dated January 13, 1903.

Application filed September 6, 1902. Serial No. 122,398. (No model.)

*To all whom it may concern:*

Be it known that I, FREDERICK SICKLES VOORHEES, a citizen of the United States, residing at Freehold, in the county of Monmouth and State of New Jersey, have invented new and useful Improvements in Hedge-Trimmers, of which the following is a specification.

This invention relates to a hedge-trimmer adapted also for general use, such as a horse-clipper; and the primary object of the same is to provide a positively-operating device of this class which can be conveniently handled and having a simple and effective construction.

The invention consists in the construction and arrangement of the several parts, which will be more fully hereinafter described and claimed.

In the drawings, Figure 1 is a front elevation of the improved trimmer or clipper, showing parts thereof in a different position in dotted lines. Fig. 2 is a transverse vertical section on the line 2 2, Fig. 1. Fig. 3 is a detail perspective view of a portion of the back or support, crank, and a part of the connecting-bar between the latter and the cutting-knives. Fig. 4 is a top plan view of a portion of the trimmer, showing a shield or cover applied thereto.

Similar numerals of reference are employed to indicate corresponding parts in the several views.

The numeral 1 designates a back or supporting bar, to which the tang 2 of a stationary handle or grip 3 is secured. Projecting forwardly from the bar 1 are a plurality of fingers 4, regularly spaced apart from each other and rendered rigid by a connecting-bar 5. Slidably mounted on the fingers 4 is a cutter 6, comprising a series of V-shaped cutting members 7, and secured to the bar 1 and projecting over the rear edge portion of the cutter 6 are retention-clips 8, which hold the cutter in close relation to the fingers 4. As shown by Fig. 2, the rear edge 9 of the cutter is shouldered to overlap the front edge of the bar 1, so as to form a slight open space between the contiguous faces of the cutting members 7 and the fingers 4 in order that the cutting operation may be practically carried on. At the center of the upper side of the bar 1 a crank 10 is movably attached and comprises a head 11, having a part thereof adjacent to the bar 1 formed with teeth 12 to provide a pinion integral with the crank, and from the head 11 a crank-arm 13 extends a suitable distance. The crank 10 is pivotally secured to the bar 1 by a pivot-screw 14, passed through the head 11, the bar 1, and the forward end of the tang 2 of the handle 3, the said pivot-screw thus serving to connect the handle 3 to the bar 1. To the free end of the crank-arm 13 one end of a connecting-bar 15 is pivotally attached and is also movably secured to one end of the cutter 6, the said connecting-bar moving closely over the side of the arm 13 in the operation of the device. On the tang 2 an oscillatable handle-bar 16 is pivotally mounted and has a grip 17 secured to the rear terminal thereof. The front extremity of the bar 16 is enlarged and formed as a toothed segment 18, which is held in continual mesh with the pinion 12, forming part of the head 11 of the crank 10, the crank in its oscillating movement working over the toothed segment 18. The handle 3 and its tang 2 are disposed at an oblique angle in relation to the bar 1, and when the handle 17 on the bar 16 is in normal position it is disposed at a rearwardly-divergent angle relatively to the handle 3.

The parts are so proportioned that when the handle 17 and bar 16 are moved into the position shown by dotted lines in Fig. 1 the cutter 6 will have been moved over the fingers 4 and returned to the position shown by Fig. 1. This operation is due to the provision of the crank-arm 13 and the attachment of the connecting-bar 15 to the free end thereof, and the same movement will be imparted to the cutter 6 by returning the handle-bar 16 and handle 17 from the position shown in dotted lines in Fig. 1 to the full-line position of the said parts, and a continuous oscillation of the bar 16 and handle 17 will set up a rapid movement of the cutter 6 and permit a hedge trimming or clipping operation to be rapidly and effectively carried on.

The advantages of the present construction are numerous, and among others may be mentioned the positive operation of the cutter by the oscillation of the segment 18 and with less tiresome effect on the operator in contradistinction to the annoyance and inconvenience incident to that class of hedge trimmers and clippers which have a rotary crank and coöperating devices for actuating the same.

Another advantage is the integral formation of the head 11 with the pinion 12, so that the crank and pinion may be simultaneously applied by the use of a single fastening or pivot screw 14.

A further advantage resides in the simplicity of the several parts and the ease with which they can be assembled in operative relation and, furthermore, in making the cutter of one piece and providing the same with a plurality of cutting or knife members. It will also be seen that through the medium of the connecting-bar 15, which exerts a steady movement of the cutter 6 without tendency to force the latter outward from the bar 1, the number of parts ordinarily required for holding a cutter in relation to fingers is materially reduced.

An additional means for rendering the improved device more practical and better adapted for the purpose for which it has been devised consists in the shield or cover 19, which surrounds the pinion 11 and the gear 18 to prevent the branches and twigs or short pieces of material falling into and clogging the teeth of the gear and obstructing the free movement of the said parts. The shield or cover 19 has segmental projections which are of such length as to compensate for the oscillating movement of the gear 18, and only extends upwardly a distance equal to the thickness of the pinion 12, so as to permit the crank devices to extend thereover.

To adapt the improved trimmer or clipper to various uses, changes in the form, proportions, dimensions, and minor details may be resorted to without in the least departing from the principle of the invention.

Having thus fully described the invention, what is claimed as new is—

1. In a device of the class set forth, the combination of a supporting-bar having a series of fingers extending therefrom, a longitudinally-sliding cutter held on the said bar, a handle rigidly attached to the center of the bar, a crank having an integral pinion pivotally mounted at the center of the upper side of the said bar, a connecting-bar movably attached at its opposite ends respectively to the crank and sliding cutter, and an oscillatable handle-bar disposed on a part of the rigid handle and having a grip and a toothed segment, the latter being held in continual mesh with the pinion of the crank.

2. In a device of the class set forth, the combination of a supporting-bar having fingers projecting therefrom, a cutter longitudinally slidable on the said bar and fingers, a crank pivotally held on the upper side of the center of the bar and having an integral pinion member close to the latter, stationary holding means secured to the center of the bar, an oscillatable handle-bar mounted on the stationary holding means and having a grip and a segment meshing with the pinion member of the crank, a connection between the crank and the cutter, and a shield surrounding the pinion of the crank under the connection to the latter and also having projections to extend over the segment forming a part of the oscillatable handle-bar.

In testimony whereof I affix my signature in presence of two witnesses.

FREDERICK SICKLES VOORHEES.

Witnesses:
JOSEPH L. DONAHAY,
I. CLARENCE CONOVER.